United States Patent

Inaishi

[11] Patent Number: 5,262,830
[45] Date of Patent: Nov. 16, 1993

[54] IMAGE FORMING APPARATUS

[75] Inventor: Kouji Inaishi, Okazaki, Japan

[73] Assignee: Brother Kogyo Kabushiki Kaisha, Nagoya, Japan

[21] Appl. No.: 913,948

[22] Filed: Jul. 17, 1992

[30] Foreign Application Priority Data

Oct. 7, 1991 [JP] Japan .................. 3-258899

[51] Int. Cl.$^5$ ............... G03B 27/32; G03B 27/52; G03G 21/00
[52] U.S. Cl. .................. 355/27; 118/689; 355/246
[58] Field of Search ............ 355/27, 208, 203, 246; 118/689; 430/138

[56] References Cited

U.S. PATENT DOCUMENTS

| | | | |
|---|---|---|---|
| 4,254,201 | 3/1981 | Sawai et al. | 430/138 |
| 4,576,891 | 3/1986 | Adair et al. | 430/138 |
| 5,060,020 | 10/1991 | Sakai | 355/245 |
| 5,103,260 | 4/1992 | Tompkins et al. | 355/208 |
| 5,107,302 | 4/1992 | Bisaiji | 355/246 |
| 5,121,163 | 6/1992 | Muramatsu et al. | 355/246 |
| 5,124,750 | 6/1992 | Naito | 355/246 |
| 5,128,718 | 7/1992 | Mizoguchi | 355/246 X |
| 5,146,274 | 9/1992 | Hattori et al. | 118/689 X |
| 5,152,740 | 9/1992 | Fujimoto | 355/246 |
| 5,155,530 | 10/1992 | Larson et al. | 355/208 |
| 5,157,440 | 10/1992 | Sawayama | 355/203 |
| 5,175,585 | 12/1992 | Matsubayashi et al. | 355/208 |
| 5,196,886 | 3/1993 | Nakane et al. | 355/246 |

Primary Examiner—Richard A. Wintercorn
Attorney, Agent, or Firm—Oliff & Berridge

[57] ABSTRACT

An image forming apparatus is capable of forming a good image without a color shade and a dropped color by coating uniformly photosensitive toner particles on a supporting member. The image forming apparatus includes a coating amount detecting unit for detecting an amount of the photosensitive toner particles coated on the supporting member, in the vicinity of a coating unit. Therefore, the image forming apparatus can determined whether a required amount of the photosensitive toner particles is coated on the supporting member, or not. When a required amount of the photosensitive toner particles is coated on the supporting member, an exposure operation is executed. When there is a part on the supporting member which is not coated with enough photosensitive toner particles, the coating unit is operated again. This processing is repeated until the whole of the supporting member is coated with the enough photosensitive toner particles. After this, the exposure operation is executed.

20 Claims, 2 Drawing Sheets

IMAGE FORMING APPARATUS

BACKGROUND OF THE INVENTION

1. Field of the Invention

The present invention relates to an image forming apparatus capable of forming an image by using photosensitive toner particles having at least one color former.

2. Description of Related Art

Toner particles having microcapsules are described in the U.S. patent application No. 07/570,594 abandoned. Each of the microcapsules encapsulates therein a color former, such as a dye-precursor, and changes mechanical strength according to the amount of the irradiated light to which it is exposed. Further, an image forming apparatus capable of forming an image on a recording medium by employing the above-mentioned toner particles is disclosed in the U.S. patent application No. 07/570,594 abandoned and U.S. Pat. No. 5,060,020. According to the image recording method of the image forming apparatus, after being exposed by an irradiated light, pressure is applied to those toner particles. Then, those toner particles which have not increased in mechanical strength are ruptured by the pressure development, so that an image is formed on a recording medium. The image forming apparatus of the type mentioned comprises a toner particle coating mechanism for coating those toner particles held by a carrying member onto a supporting member, such as a supporting drum, by using static electricity, an exposing mechanism for exposing those microcapsule toner particles based on an image information, and a microcapsule rupturing mechanism for rupturing those capsules such that the color former flows out from each of the ruptured microcapsules.

However, in the conventional image forming apparatus, there is the possibility that those photosensitive toner particles can not be uniformly coated on the supporting member owing to the differential among the amount of electricity applied to each of those toner particles. Therefore, it is problem that a formed image has color shading (uneven color), that is, a light colored part, or a dropped color, that is, a non-colored part.

SUMMARY OF THE INVENTION

It is therefore an object of the present invention to provide an image forming apparatus capable of forming a good image without color shading or uneven color and a dropped color by uniformly coating the photosensitive toner particles on the supporting member.

To achieve this object, the image forming apparatus of the present invention comprise a coating unit for coating photosensitive toner particles having at least one color former on a supporting member, an exposing unit for exposing those photosensitive toner particles coated and held on the supporting member based on a desired image patten, and a transferring unit for transferring the photosensitive toner particles, which were coated on the supporting member, onto a transfer material, and a coating amount detecting unit for detecting an amount of the photosensitive toner particles coated on the supporting member.

In the image forming apparatus having the above-mentioned construction, an amount of the photosensitive toner particles which are coated on the supporting member is detected by a coating amount detecting unit. In this manner, it is determined whether a necessary amount of the photosensitive toner particles is coated on the supporting member, or not. When a necessary amount of the photosensitive toner particles is coated on the supporting member, an exposure operation is executed. When there is a part on the supporting member which is not coated with enough photosensitive toner particles, the coating unit is operated again. This processing is repeated until the whole of the supporting member is coated with enough photosensitive toner particles. After this, the exposure operation is executed.

The photosensitive toner particles held on the supporting member are hardened or softened by the exposure operation, so that a latent image is formed. Next, those toner particles are subjected to pressure or heat, so that a desired image is formed on the transferred material.

As described above, in the image forming apparatus of the present invention, an amount of the toner particles on the supporting member can be detected. Therefore, when the supporting member is not coated with enough toner particles, the supporting member is repeatedly coated with toner particles until the whole of the supporting member is coated with enough photosensitive toner particles. Therefore, the supporting member is coated with enough toner particles without fail before the exposure operation, so that a good image is formed without color shading (uneven color) and a dropped color.

BRIEF DESCRIPTION OF THE DRAWINGS

A preferred embodiment of the present invention will be described in detail with reference to the following figures wherein.

DETAILED DESCRIPTION OF THE PREFERRED EMBODIMENT

Hereinafter, one embodiment which embodies the present invention will be explained with reference to the figures.

Figure 1:
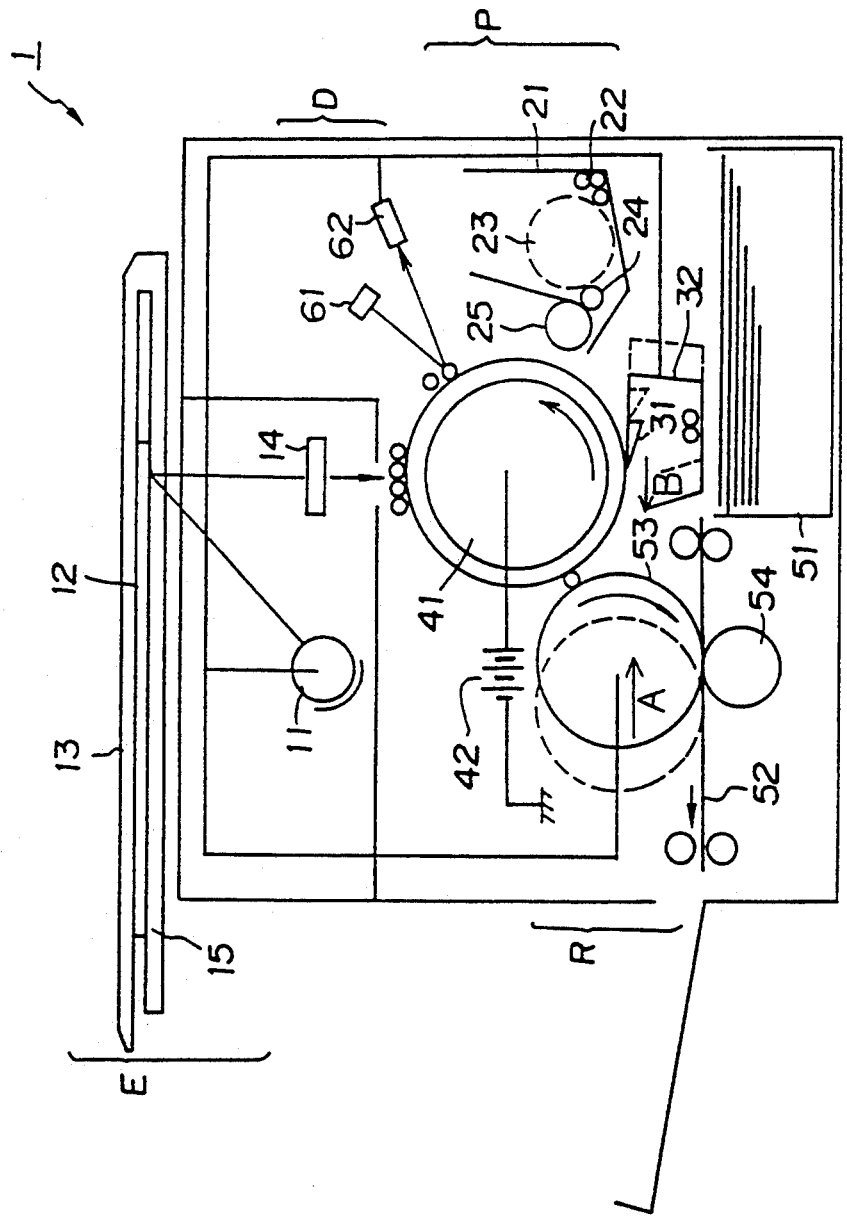
FIG. 1 is a schematic construction view of the image forming apparatus of one embodiment of the present invention.

FIG. 1 is a schematic construction view of an image forming apparatus employing photosensitive microcapsule toner particles.

As shown in FIG. 1, the image forming apparatus 1 of the present invention comprises a coating unit P for coating the photosensitive toner particles on a supporting member, an exposing unit E for exposing those photosensitive toner particles on the supporting member based on a desired image pattern, a transferring unit R for transferring those photosensitive toner particles coated on the supporting member toward a transfer material and a coating amount detecting unit D for detecting an amount of the photosensitive toner particles coated on the supporting member. In this embodiment, the coating unit P is provided on the center right portion of the image forming apparatus 1, the exposing unit E is provided on an upper portion, the transferring unit R is provided on a lower portion, and the coating amount detecting unit D is provided on the right upper portion, respectively.

The coating unit P comprises a toner particle supporting drum 41 which is rotatable, a power supply 42 which is connected to the toner particles supporting drum 41 and a toner particle case 21 which is a container for storing toner particles therein. The toner particle case 21 is provided near the toner particle supporting drum 41. The coating unit P further comprises an agitator 23 for stirring the toner particles in the toner particle case 21, a toner particle carrying roller 25 for carrying those toner particle and a supplying roller 24 for supplying those toner particle to the toner particles carrying roller 25. The toner particle case 21 stores photosensitive microcapsule toner particles 22 as the photosensitive toner particles, therein. The toner particle supporting drum 41 is made of an aluminum material. Since the toner particle supporting drum 41 is connected to the power supply 42, an electric field is generated between the supporting drum 41 and the carrying roller 25.

The photosensitive microcapsule toner particles 22 used in the image forming apparatus of the present invention comprise at least a color former and a photocurable material. Therefore, the microcapsule toner particles 22 change mechanical strength according to the amount of the irradiated light to which they are exposed. The photocurable material is made by mixing a polymerizable compound and a photo initiator. Each of the microcapsules encapsulates the photocurable material inside a resinous wall and can be formed by known methods such as by an interfacial polycondensation method of emulsifying the photocurable material in a water, an in situ method and a spray capsuling method. The above-mentioned methods are well-known. Next, the microcapsules having the photocurable material therein are dried by a spray dry method and a vacuum dry method, so that microcapsule toner particles 22 are made. To enhance the flowability and a chargeability of the microcapsule toner particles 22, inorganic and/or organic powders, or charging control powder are coated on the surface of the microcapsule toner particles 22. Examples of such materials are powders of silicon oxide, titanium oxide and aluminum oxide and powders of styrene, acrylic and polycarbonate resins. The above-mentioned processing is executed according to the well-known technique for reforming the surface of those toner particles.

Figure 2:
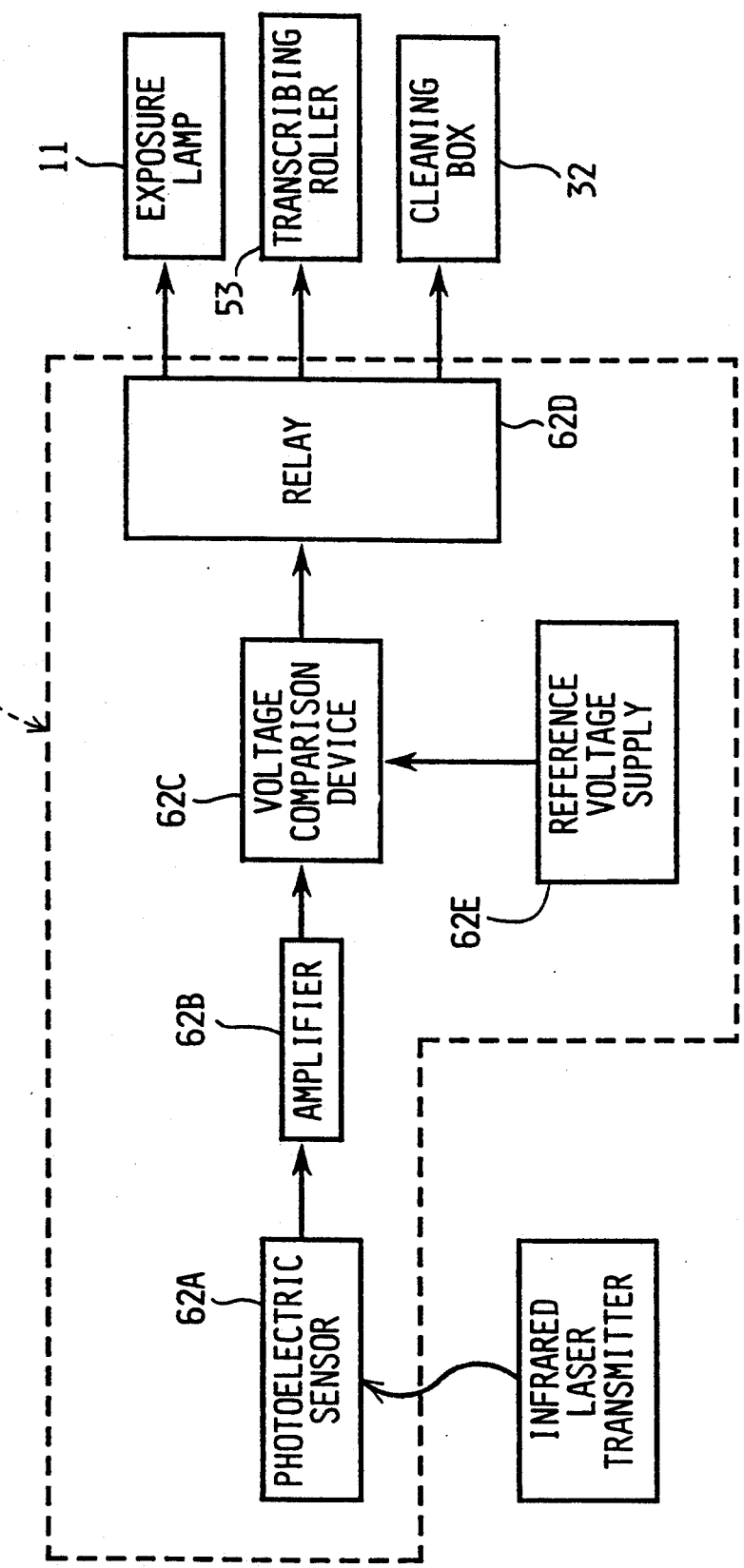
FIG. 2 is a block diagram of a toner detection control device.

The photosensitive toner particles 22 coated on the supporting drum 41 by the coating unit P are carried by rotation of the supporting drum 41. The coating of microcapsules is carried past a coating amount detecting unit D. The coating amount detecting unit D comprises an infrared laser transmitter 61 and a toner detection control device 62. The infrared laser transmitter 61 irradiates a laser beam of a wavelength with which the photosensitive microcapsule toner particles 22 do not react. The toner detection control device 62 detects the laser beam reflected from the supporting drum 41 after being irradiated from the infrared laser transmitter 61, and outputs the detection result with a signal. As shown by the block diagram of FIG. 2, the toner detection control device 62 comprises a photoelectric sensor 62A, an amplifier 62B, a voltage comparison device 62C and relay 62D. After the photoelectric sensor 62A receives the laser beam, the photoelectric sensor 62A generates a voltage which is in proportion to the amount of the received laser beam. Since the amount of the voltage is very slight, the amplifier 62B amplifies the voltage and applies the amplified voltage to the voltage comparison device 62C. When the voltage comparison device 62C is applied with the voltage which is higher than a reference voltage from a reference voltage supply 62E, the voltage comparison device 62C applies the voltage to the relay 62D, so that the relay 62D is operated. The reference voltage is adjustable and is set to a level representative of a desired coating amount of microcapsules on drum 41.

When an amount of those photosensitive toner particles 22 on the supporting drum 41 is not enough, an amount of the reflected infrared laser beam is large in quantity. Therefore, according to the above-mentioned processing, the voltage becomes high, so that the relay 62D is operated. The relay 62D is connected to an exposure lamp 11 (to be described later), a transferring roller 53 and a cleaning box 32. Usually, the transferring roller 53 and the cleaning box 32 are set to be in the position shown by the solid line of FIG. 1. This condition is called as an ON condition or an operating condition. However, when the relay 62D is operated, the exposure lamp 11 does not light. At this time, the transferring roller 53 and the cleaning box 32 move to the position shown by the dotted line of FIG. 1. This condition is called as an OFF condition or a non-operating condition.

On the other hand, the exposing unit E comprises the exposure lamp 11, an original support stand glass 15 which is provided above the exposure lamp 11, an original support stand glass cover 13 which can be opened and shut on the support stand glass 15 and a filter 14 which is provided above the supporting drum 41 and is used for adjusting the color tone of an image.

The transferring unit R for transferring the photosensitive toner particles 22 coated on the supporting drum 41 onto a transfer material is provided downstream of the exposing unit E, in the direction of rotation of drum 41. The transferring unit R can move (toward the direction shown by an arrow A) so as to come in contact with the supporting drum 41 and further comprises a rotatable transferring roller 53. The transferring roller 53 comes in contact with the supporting drum 41 in order to transfer the photosensitive toner particles. Further, in the direction of movement of the supporting drum 41 passing the transferring unit R, the cleaning box 32 having a cleaning blade 31 is provided. The cleaning box 32 can move (toward the direction shown by an arrow B) so as to come in contact with the supporting drum 41.

Moreover, under the transferring roller 53, a pressure roller 54, which can come in contact with the transferring roller 53, is provided. A transfer paper 52, for example, serves as the transfer material and is held between the rollers 53, 54 and is delivered. The transfer paper 52 is stored in a sheet cassette 51 before being delivered.

Next, an operation of the image forming apparatus will be explained.

When a start switch (not shown) is turned on, the supporting drum 41 rotates and the agitator 23 and the supplying roller 24 rotate. The photosensitive microcapsule toner particles 22 are charged by rotation of the agitator 23, and the photosensitive microcapsule toner particles 22 are supplied to the carrying roller 25 by the supplying roller 24. The photosensitive microcapsule toner particles 22 on the carrying roller 25 are attracted toward the direction of the supporting drum 41 under the influence of the electric field formed between the supporting drum 41 and the carrying roller 25. That is, the photosensitive microcapsule toner particles 22 fly to the supporting drum 41 and are held on the surface of the supporting drum 41.

The supporting drum 41 having the photosensitive microcapsule toner particles 22 thereon continues rotating, so that the surface having the photosensitive microcapsule toner particles 22 is presented toward the coating amount detecting unit D. The laser beam irradiated from the infrared laser transmitter 61 of the coating amount detecting unit D passes through the photosensitive toner particles 22, and is reflected from the supporting drum 41. The reflected laser beam is detected by the toner detection control device 62. The toner detection control device 62 senses an amount of the coated toner particles 22 on the surface of drum 41 and outputs an signal having the detection result to the exposure lamp 11, the transferring roller 53 and the cleaning box 32. When enough photosensitive toner particles 22 are coated on the supporting drum 41, the exposure lamp 11 lights, and the transferring roller 53 and the cleaning box 32 come in contact with the supporting drum 41, respectively. On the contrary, when the amount of photosensitive toner particles 22 coated on the supporting drum 41 is not enough, the exposure lamp 11 does not light. At this time, the transferring roller 53 and the cleaning box 32 move to the position shown by the dotted line of FIG. 1. Under the OFF condition, the supporting drum 41 rotates again such that the photosensitive toner particles 22 are coated again on the supporting drum 41.

When the amount of photosensitive microcapsule toner particles 22 coated on the supporting drum 41 is sufficient, the following operation is executed.

By rotation of the supporting drum 41, the surface coated with photosensitive microcapsule toner particles 22 is turned to the exposing unit E.

Then, the exposure light lights, and the original support stand glass, 15 on which an original 12 is placed, moves. And, the exposure operation is executed corresponding to the original 12. The light reflected from the original 12 passes through the filter 14 in order to adjust the color tone of the image, and forms an image-formation on the photosensitive toner particles 22 coated on the supporting drum 41. Then, the exposed microcapsule toner particles 22 are hardened as a result of photopolymerization of a photosensitive resin material within or forming the microcapsules comprising the toner particles 22.

Further, the supporting drum 41 rotates, so that those exposed microcapsule toner particles 22 are conveyed near the transferring roller 53. Next, those microcapsule toner particles 22 are sandwiched between the supporting drum 41 and the transferring roller 53 so as to be subjected to pressure. So that, those microcapsule toner particles 22 which do not increase mechanical strength are ruptured by the pressure development. The color former flows out from each of the ruptured microcapsules and adheres to the transferring roller 53. On the other hand, a transfer paper 52 is taken out from the sheet cassette 51 and introduced between the transferring roller 53 and the pressure roller 54. The color former which adheres to the transferring roller 53 is transcribed onto the transfer paper 52 by the pressure of the pressure roller 54. Thus, an image is formed on the transfer paper 52.

After the transferring roller 53 applies pressure to the microcapsule toner particles 22 coated on the supporting drum 41, the supporting drum 41 moves into contact with the cleaning blade 3. Then, the hardened microcapsules and the ruptured microcapsules are taken off from the supporting drum 41 by the cleaning blade 31.

This invention is not limited to the above mentioned embodiment. It should be understood that many changes and modifications may be made in that embodiment without departing from the scope of the present invention. For instance, the photosensitive toner particles can be directly transcribed onto the transfer paper from the supporting drum 41. Also, the photosensitive toner particles are not only the microcapsule type but can be the light softened type. Moreover, subliming color formers may be used. In this case, the photosensitive toner particles are transcribed to the transfer paper from the supporting drum by heat without contact. Moreover, a belt may be used in place of the supporting drum.

The method of detecting the amount of photosensitive toner particles coated on drum 41 by the coating amount detecting unit is not limited to the above mentioned embodiment. For instance, ultrasonic wave systems, X ray systems, visible ray systems, and ultraviolet ray systems may be used if the photosensitive toner particles does not react with the radiation used for detection. Further, the detection portion and the control portion may be separate, so long as the coating amount detecting unit is downstream of the coating unit.

What is claimed is:

1. A image forming apparatus comprising:
   coating means for coating photosensitive toner particles having at least one color former on a supporting member;
   exposing means for exposing the photosensitive toner particles coated and held on the supporting member based on a desired image pattern;
   transferring means for transferring the photosensitive toner particles coated on the supporting member onto a transfer material; and
   coating amount detecting means for detecting an amount of the photosensitive toner particles coated on the supporting member.

2. Apparatus as in claim 1, further comprising control means responsive to the coating amount detecting means for controlling operation of the exposing means.

3. Apparatus as in claim 2, wherein the coating amount detecting means includes means for determining if the amount of toner particles on the supporting member exceeds a predetermined amount and the control means enables operation of the exposing means when the coating amount detecting means detects an amount of toner particles on the supporting member in excess of said predetermined amount.

4. Apparatus as in claim 3, wherein the coating amount detecting means includes generator means for directing a signal at the supporting member and receiving means for receiving a portion of said signal reflected from the supporting member.

5. Apparatus as in claim 4, wherein the coating amount detecting means includes means for comparing the level of the reflected signal received by the receiving means with a predetermined signal reference level.

6. Apparatus as in claim 5, wherein the generating means includes means for directing electromagnetic energy toward the supporting member.

7. Apparatus as in claim 6, wherein the generating means includes a laser.

8. Image forming apparatus comprising:
   a toner particle receiving member;
   a coating means for coating photosensitive toner particles on the toner particle receiving member;

exposing means for exposing the toner particles on the toner particle receiving member in an image pattern; and control means for controlling operation of the exposing means in response to detection of an amount of toner particles on the toner particle receiving member.

9. Apparatus as in claim 8, wherein the control means included coating amount detecting means for determining if the amount of toner particles on the toner particle receiving member exceeds a predetermined amount.

10. Apparatus as in claim 9, wherein the coating amount detecting means includes generator means for directing a signal toward the toner particle receiving member and detector means for receiving a portion of the signal which is reflected from the toner particle receiving member.

11. Apparatus as in claim 10, wherein the coating amount detecting means includes means for providing a reference signal having a predetermined level and means for comparing the level of the reference signal with the level of the portion of the reflected signal received by the detector means.

12. Apparatus as in claim wherein the generator means includes a source of electromagnetic radiation.

13. Apparatus as in claim 12, wherein the generator means includes a laser.

14. Apparatus as in claim 8, further comprising transfer means for transferring toner particles from the toner particle receiving member to a transfer member, the transfer means including means responsive to the control means for enabling transfer of the toner particles from the toner particle receiving member to the transfer member.

15. Apparatus as in claim 8, further comprising cleaning means for cleaning the toner particle receiving means, the cleaning means including means responsive to the control means for enabling the cleaning means to clean the toner particle receiving means.

16. Image forming apparatus comprising:

a supporting member;

a coating means for coating photosensitive toner particles on the supporting member;

exposing means for exposing the toner particles on the supporting member in an image forming pattern;

transfer means for transferring the photosensitive toner particles on the supporting member to a transfer material;

cleaning means for removing toner particles from the supporting member;

coating amount detecting mean for detecting an amount of toner particles coated on the supporting member; and control means for enabling operation of the exposing means, the transfer means and the cleaning means in response to detection of a predetermined amount of toner particles on the supporting member by the coating amount detecting means.

17. Apparatus as in claim 16, wherein the coating amount detecting means includes generator means for directing a signal toward the supporting member; detector means for receiving a portion of the signal which is reflected from the supporting member; means for providing a reference signal having a predetermined level and means for comparing the level of the reference signal with the level of the portion of the reflected signal received by the detector means.

18. Apparatus as in claim 17, wherein the generator means includes a source of electromagnetic radiation.

19. Apparatus as in claim 18, wherein the photosensitive toner particles are sensitive to a predetermined range of wavelengths of electromagnetic radiation in which the photosensitive toner particles are reactable, and wherein the generator means generates a beam of electromagnetic radiation, having a wavelength outside of the range in which the photosensitive toner particles are reactable.

20. Apparatus as in claim 19, wherein the generator means includes an infrared laser generator.

* * * * *